(12) United States Patent
Van Campenhout et al.

(10) Patent No.: US 7,992,884 B2
(45) Date of Patent: Aug. 9, 2011

(54) STEERING SYSTEM

(75) Inventors: Adrian Van Campenhout, Plymouth, MI (US); Slawomir J. Herman, Harrison Township, MI (US); John O. Heimbecher, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 771 days.

(21) Appl. No.: 11/381,599

(22) Filed: May 4, 2006

(65) Prior Publication Data

US 2007/0256886 A1  Nov. 8, 2007

(51) Int. Cl.
*B62D 3/12* (2006.01)

(52) U.S. Cl. .................. 280/93.514; 280/93.515

(58) Field of Classification Search ........... 280/93.51, 280/93.511, 93.512, 93.514, 93.515
See application file for complete search history.

(56) References Cited

U.S. PATENT DOCUMENTS

| | | | | |
|---|---|---|---|---|
| 3,157,061 A * | 11/1964 | Parker | | 74/498 |
| 4,369,669 A * | 1/1983 | Allen | | 74/422 |
| 4,572,024 A * | 2/1986 | Narita | | 74/422 |
| 4,663,980 A * | 5/1987 | Narita | | 74/422 |
| 5,002,142 A * | 3/1991 | Klosterhaus | | 180/444 |
| 5,197,561 A * | 3/1993 | Holka | | 280/93.51 |
| 7,290,778 B2 * | 11/2007 | Domin | | 280/93.515 |

FOREIGN PATENT DOCUMENTS

| | | |
|---|---|---|
| DE | 4328156 C1 * | 10/1994 |
| DE | 4422559 A1 * | 7/1995 |
| EP | 0134004 | 3/1985 |
| FR | 2797243 | 2/2001 |
| FR | 2832973 | 6/2003 |
| GB | 614670 | 12/1948 |
| GB | 1181353 | 2/1970 |
| JP | 58093537 | 11/1981 |
| JP | 60038260 | 8/1983 |

* cited by examiner

*Primary Examiner* — Paul N Dickson
*Assistant Examiner* — Daniel Yeagley
(74) *Attorney, Agent, or Firm* — Ralph E. Smith

(57) ABSTRACT

A steering system including a rack and pinion, and two tie rods is provided. The rack has a rack axis, and each of the two tie rods has a tie rod axis. The rack is engaged by the pinion, such that rotation of the pinion drives the rack to move in a linear direction. Each of the two tie rods has its first end connected to the rack, such that the tie rod axis is offset from the rack axis. Further, each of the two tie rods has a second end, which is connected to the wheels of a vehicle.

6 Claims, 6 Drawing Sheets

STEERING SYSTEM

FIELD OF THE INVENTION

The present invention generally relates to a steering system for a vehicle. More particularly, the present invention relates to a rack and pinion assembly for the steering system.

BACKGROUND OF THE INVENTION

A vehicle, in general, includes various components such an engine, suspension and transmission components, and a steering system which are packed together in an engine compartment of the vehicle. These vehicle components are packed with relation to each other to form a definite architecture.

The vehicle components are installed in a limited space in the engine compartment. This installation should be carried out in such a manner that the height of a vehicle from the ground is minimal. The installation should also be such that it allows the mounting of small-diameter wheels on the vehicle. Further, the installation should ensure maximum space utilization in the engine compartment. This is possible only by compactly packaging the vehicle components in the engine compartment.

The steering system of a vehicle is a crucial component for compact packaging since it is used to control the direction of the motion of the vehicle by maneuvering its wheels. The wheels are steered by transmitting operations of a manually steerable member, such as a steering wheel, to the wheels. The steering system includes various linkages that have a definite geometry. These linkages can place constraints on the installation of the suspension components with relation to the engine and the transmission components. Hence, there is a need for a steering system, which provides the possibility of compactly packaging suspension components with relation to the engine and the transmission components in the engine compartment.

SUMMARY OF THE INVENTION

It is an object of the present invention to provide a steering system for a vehicle that provides the possibility of compactly packaging suspension components with relation to an engine and transmission components.

Another object of the present invention is to provide a compactly packed engine compartment so that the height of a vehicle from the ground is minimal.

Another object of the present invention is to provide a steering system, which enables the mounting of small-diameter wheels on the vehicle.

Yet another object of the present invention is to provide a steering system, which has two tie rods that can be oriented for maximum geometric benefits while packaging various vehicle components in an engine compartment.

The present invention provides a steering system to steer the wheels of a vehicle. The steering system includes a rack and pinion, and two tie rods. The rack has a rack axis. The pinion engages the rack such that rotation of the pinion drives the rack to move in a linear direction. Each of the two tie rods have a first end connected to the rack, such that a tie rod axis of a tie rod is offset from the rack axis. Further, each of the two tie rods has a second end, which is connected to a knuckle on which a bearing is attached. A wheel of the vehicle is attached to the bearing.

The two tie rods can be oriented for compact packaging in the engine compartment. Further, the offset between tie rods and the rack provides an option for efficient packaging of suspension components with relation to the engine and the transmission components in the engine compartment. Moreover, efficient packaging of the engine, the suspension components, and the transmission components in the engine compartment helps to reduce the height of the vehicle from the ground. Furthermore, the steering system of the present invention provides an option for mounting small-diameter wheels on the vehicle.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF THE EMBODIMENTS

The present invention describes a steering system with a rack, a pinion, and two tie rods. The rack has a rack axis and is engaged to the pinion, such that rotation of the pinion drives the rack to move in a linear direction. Each of the two tie rods has a tie rod axis. A first end of each of the two tie rods is connected to the rack such that a tie rod axis is offset from the rack axis. The second end of each of the two tie rods is connected to a knuckle attached with a bearing. Further, a wheel is attached to the bearing. In an embodiment, the steering system of a vehicle is used to steer the wheels by means of a steerable member, typically a steering wheel.

Figure 1:
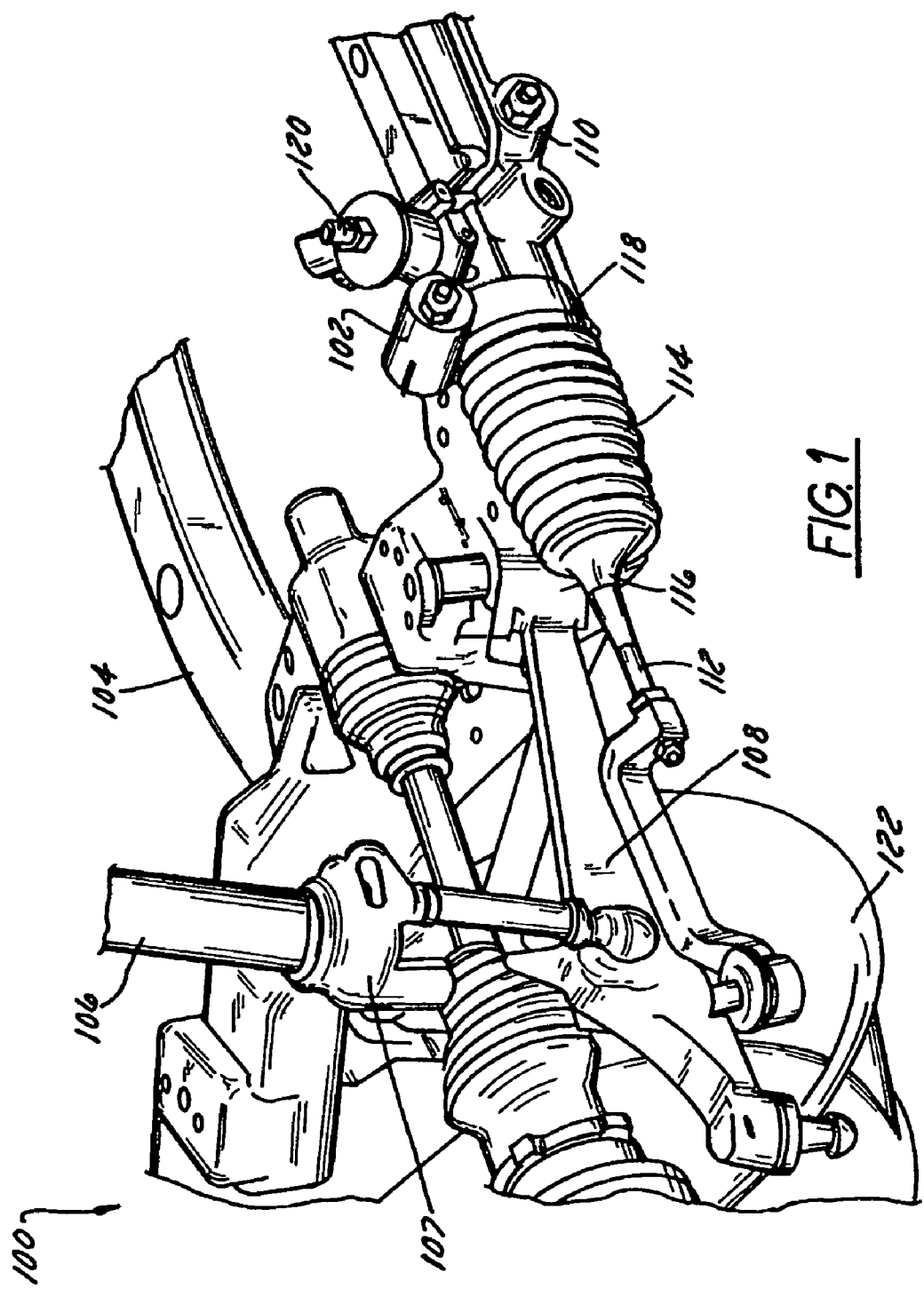
FIG. 1 illustrates a steering system installed in an engine compartment of a vehicle, in accordance with various embodiments of the present invention.

FIG. 1 illustrates a steering system installed in an engine compartment 100 of a vehicle, in accordance with various embodiments of the present invention. Engine compartment 100 is shown to include, in addition to other components, a steering system 102, a chassis 104, and a suspension system including a shock absorber 106, a shock clevis 107, and a suspension link 108. Other components (not shown in FIG. 1) include an engine, transmission components, strut rods, control arms, brake components, and so forth.

The engine produces power by burning fuel, which, in effect, mobilizes the vehicle. The engine can be mounted on chassis 104. The suspension system connects wheels to chassis 104 and ensures that the occupants of the vehicle are comfortable and reasonably well insulated from road noise, bumps, and vibrations. The shock clevis 107 connects the shock absorber 106 and the suspension link 108. The transmission components include a gearbox that can transmit power from the engine to rotate a front/rear axle for vehicular motion. Steering system 102 includes a housing 110, two tie rods such as a tie rod 112, two bellows such as a bellow 114, a plurality of clamps such as clamps 116 and 118, and an input shaft 120. In an embodiment steering system 102 includes two tie rods and two bellows. Housing 110 encapsulates a rack and a pinion (the rack and the pinion are not shown in FIG. 1). Rotation of the pinion drives the rack to move in a linear direction. In an embodiment of the present invention, the linear motion is along the length of the rack. A first end of tie rod 112 is connected to the rack, and second end of tie rod 112 is connected to a knuckle. A bearing is attached to the knuckle; a wheel 122 is attached to the bearing. Bellow 114 has a first end clamped to the first end of tie rod 112 by means of clamp 116. Clamp 118 clamps a second end of bellow 114 to housing 110.

Figure 2:
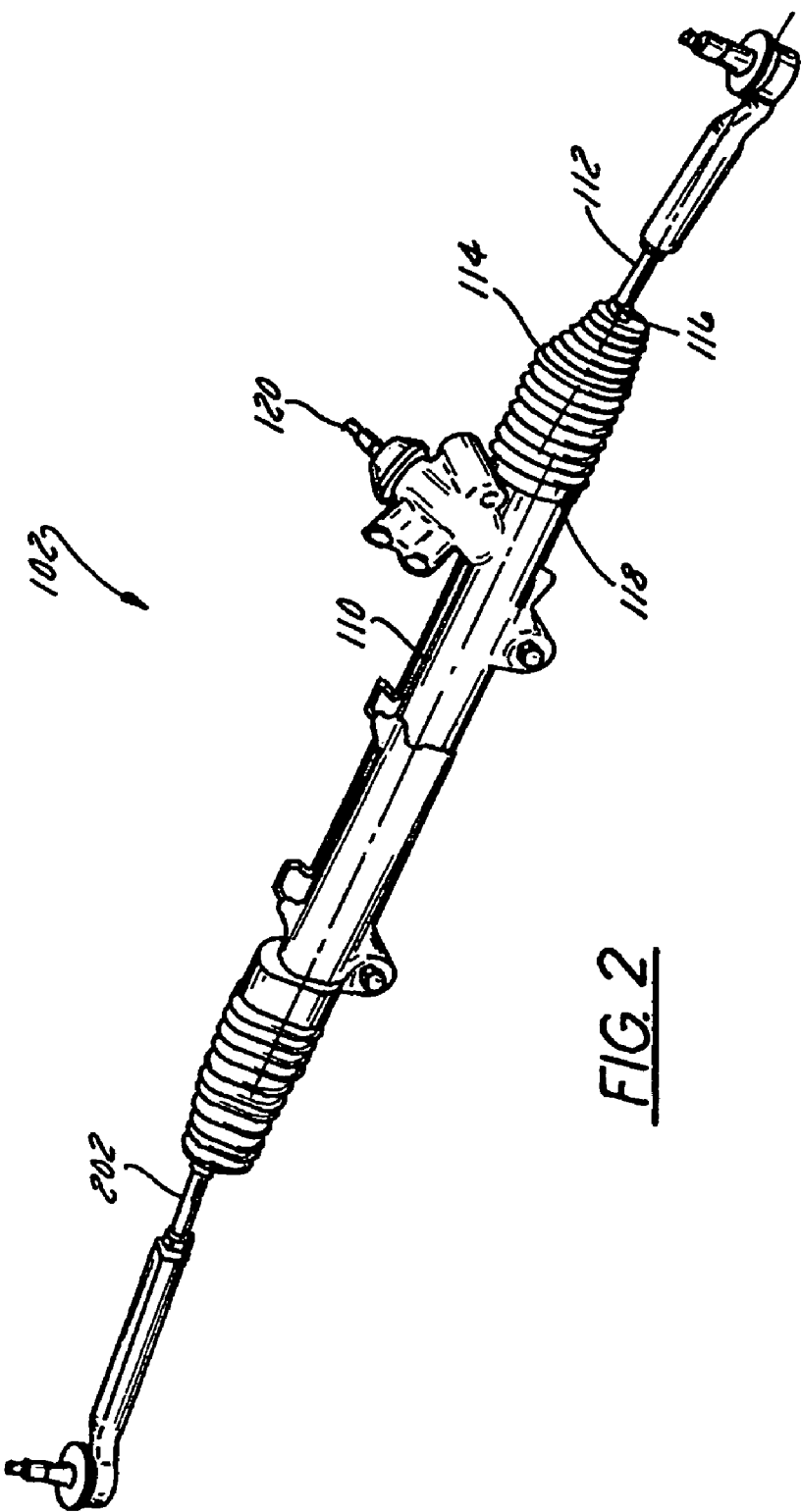
FIG. 2 illustrates the steering system, in accordance with another embodiment of the present invention.

FIG. 2 illustrates steering system 102, in accordance with an embodiment of the present invention. Steering system 102 includes tie rods 112 and 202 that can be connected to two wheels of the vehicle. The two wheels can be the front wheels or the rear wheels of the vehicle. A steerable member can be connected to input shaft 120. Examples of the steerable member include, but are not limited to, a steering wheel, a single-lever steering, and a dual-lever steering. The steerable member provides control over steering system 102 by rotating input shaft 120. The rotational motion of input shaft 120 is converted to a translatory motion of the rack, which directs the wheels of the vehicle. In an embodiment of the present invention, input shaft 120 is position-variable in steering system 102, depending on whether it has a right-hand or left-hand drive. Steering system 102 is described further in conjunction with FIG. 3.

Figure 3:
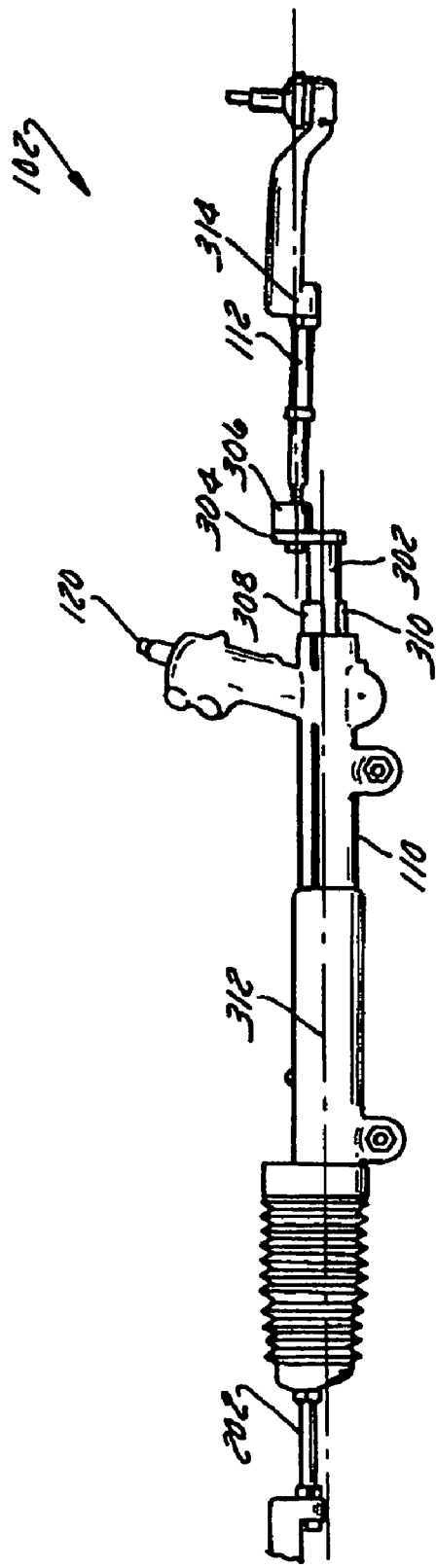
FIG. 3 illustrates the steering system with a bellow removed, in accordance with an embodiment of the present invention.

FIG. 3 illustrates steering system 102 with bellow 114 removed, in accordance with an embodiment of the present invention. Steering system 102 includes a rack 302, an offset-plate 304, a ball-joint 306, and at least one fin such as fins 308 and 310, in addition to tie rod 112 and input shaft 120. Rack 302 has a rack axis 312 and tie rod 112 has a tie rod axis 314. In an embodiment of the present invention, rack axis 312 and tie rod axis 314 are central axes along the length of rack 302 and tie rod 112, respectively. Rack 302 is engaged with a pinion (not shown in FIG. 3). Rack 302 has rack teeth and the pinion has pinion teeth. Rack 302 is engaged with the pinion such that the rack teeth mesh with the pinion teeth. A rotation in the pinion causes rack 302 to move in a linear direction. Rack 302 is connected to tie rod 112 by offset-plate 304, which offsets rack axis 312 and tie rod axis 314. The offset is based on a predefined value. The parameters on which the predefined value depends include, but are not limited to, the length of rack 302, the length of fins 308 and 310, the physical dimensions of the suspension components, and reaction forces acting on the steering system 102. An exemplary value of offset is 25 mm. Offset-plate 304 is connected to the first end of tie rod 112 through ball-joint 306. Bellow 114 encapsulates offset-plate 304 and ball-joint 306. The second end of tie rod 112 can be connected to wheel 122. A movement of rack 302 in a linear direction causes tie rod 112 to move, thereby steering wheel 122.

In an embodiment of the present invention, the offset may cause torsional and bending forces to act on steering system 102. In another embodiment of the present invention, the vehicle load affects steering system 102. To balance the torsional and bending loads, and the vehicle load on steering system 102, fins are attached to rack 302. In an embodiment of the present invention, fins 308 and 310 are attached to rack 302. The rack travel is the total length rack 302 travels in one direction. The rack offset is the offset between rack axis 312 and tie rod axis 314. The fins move along with rack 302. The movement of the fins is smoothened and controlled by installing at least one bearing along with the fins. (Bearings are not shown in FIG. 3.) The physical dimensions of the fins are based on predefined parameters. Examples of the physical dimensions include, but are not limited to, length, cross sectional area, and area of surface contact. In an embodiment of the present invention, the surface contact is a contact between the fins, the at least one bearing, and at least one groove present in housing 110. Examples of the predefined parameters include, but are not limited to, a rack travel, a rack offset, a load generated by the vehicle, the reaction forces, and the torsional and bending loads.

Figure 4:
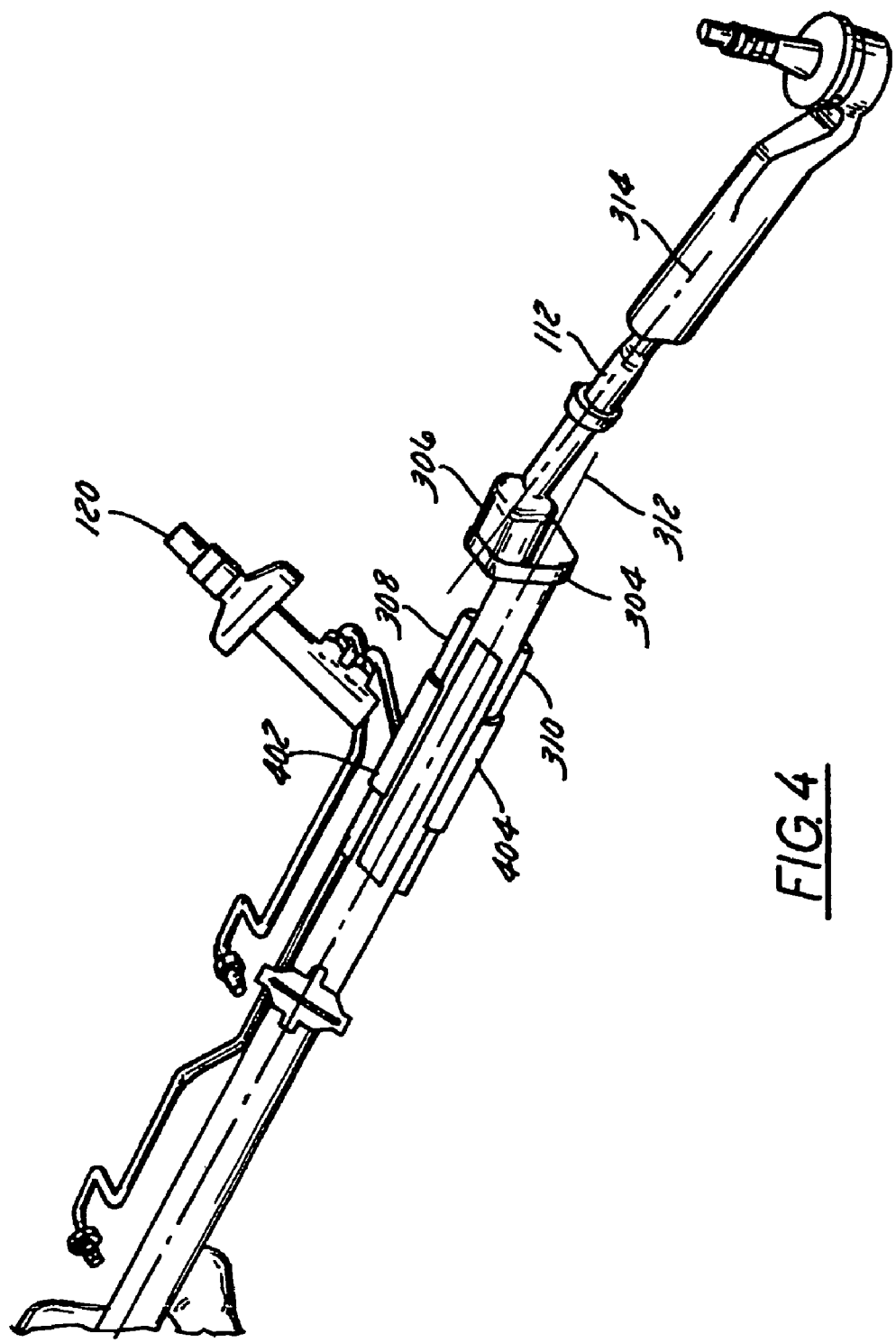
FIG. 4 illustrates the steering system with housing and the bellow removed, in accordance with an embodiment of the present invention.

FIG. 4 illustrates steering system 102, with housing 110 and bellow 114 removed, in accordance with an embodiment of the present invention. Steering system 102 is shown to include at least one fin such as fins 308 and 310, and at least one bearing such as the bearings 402 and 404. Bearings 402 and 404 provide a sliding path for fins 308 and 310, respectively, ensuring that the fins' movement is smooth and controlled. Examples of types of bearings include, but are not limited to, ball bearings, roller bearings, and tapered roller bearings, and non-roller bearings. The physical dimensions of the at least one bearing, such as length of the bearings, are based on one or more of a length of the fins, material of the at least one bearing, rack travel, and the torsional and bending loads.

Figure 5:
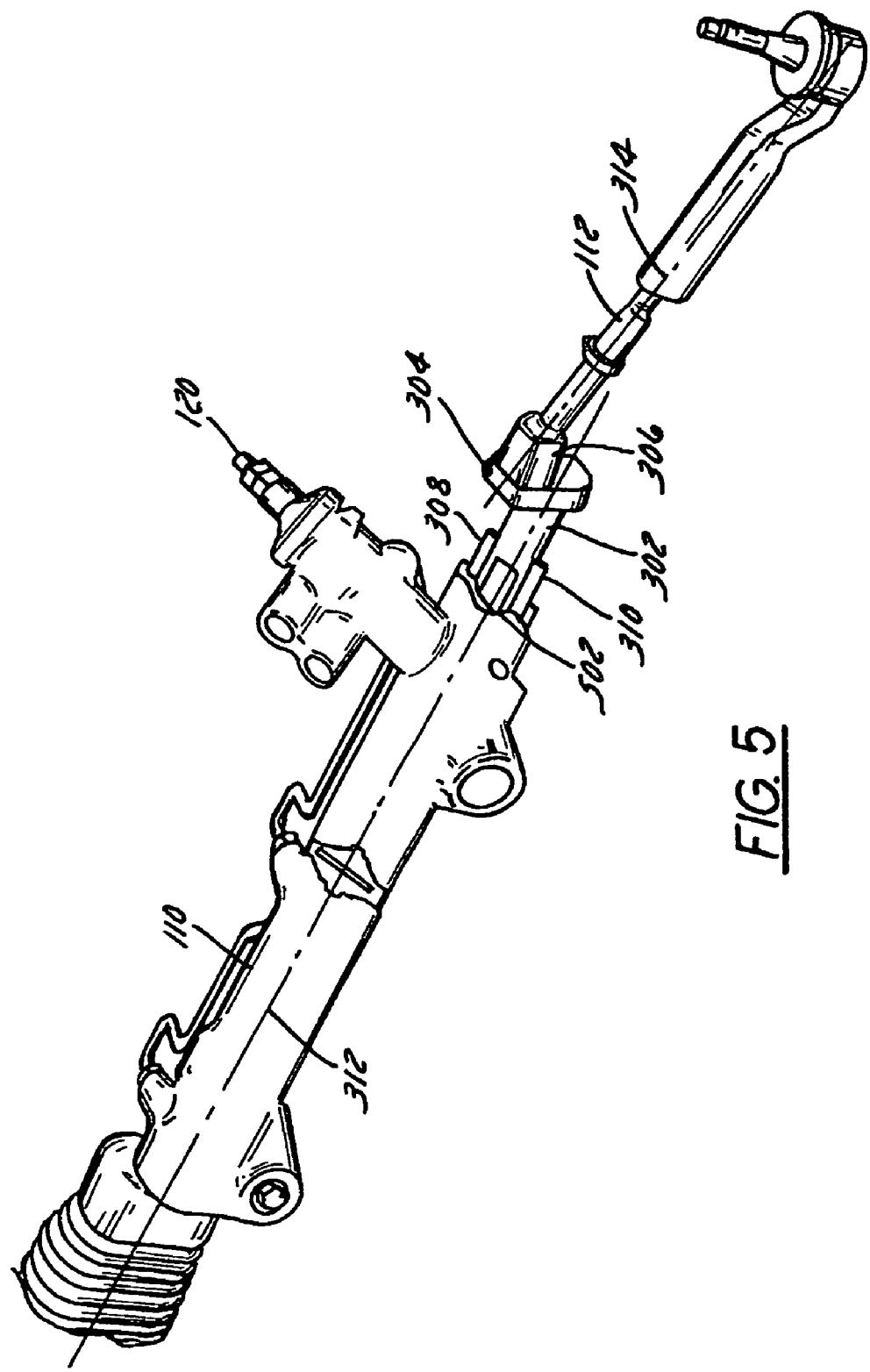
FIG. 5 illustrates the steering system with the first end of the housing removed, in accordance with an embodiment of the present invention.

FIG. 5 illustrates steering system 102 with the first end of housing 110 removed, in accordance with an embodiment of the present invention. The figure depicts fins 308 and 310 and rack 302 emerging from the first end of housing 110. Fins 308 and 310 slide in bearings 402 and 404 respectively Housing 110 has at least one groove, which encloses at least one bearing, such as bearings 402 and 404. In an embodiment of the present invention, the groove is a U-groove 502, which encloses bearings 402 and 404. In an embodiment of the present invention, U-groove 502 can be machined on the first end of housing 110. The physical dimensions of U-groove 502 can depend on dimensions of the fins, dimensions of the bearings, types of bearings, and so forth.

Figure 6:
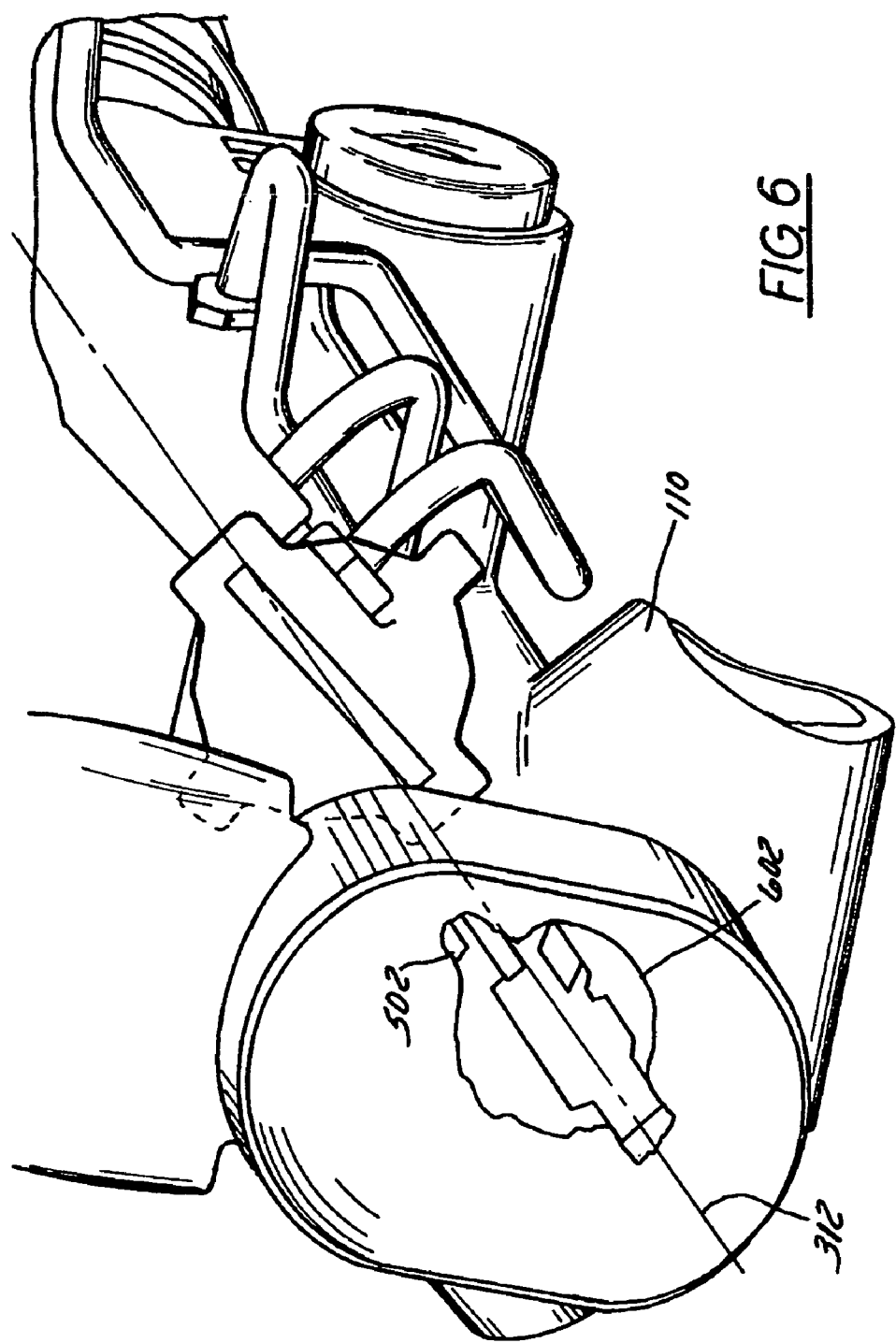
FIG. 6 illustrates the housing, in accordance with an embodiment of the present invention.

FIG. 6 illustrates housing 110, in accordance with an embodiment of the present invention. Housing 110 includes U-groove 502 and a rack chamber 602 at its first end. U-groove 502 provides support to bearing 402 from the first side of bearing 402. The second side of bearing 402 forms the sliding path of fin 308. Similarly, U-groove 502 supports the first side of bearing 404. The second side of bearing 404 forms the sliding path of fin 310. Fins 308 and 310 move linearly on the sliding path. Rack 302 is placed in rack chamber 602, present in housing 110. The shape and size of rack chamber 602 depends on the physical dimensions of rack 302, and fins 308 and 310. In an embodiment of the present invention, rack chamber 602 has a circular shape.

Various embodiments of the present invention also describe a rack and a pinion assembly for the steering wheels of a vehicle. The rack and pinion assembly includes a rack and a pinion. The rack has a rack axis. The pinion is engaged to the rack, such that rotation of the pinion drives the rack to move in a linear direction. Further, the rack includes two tie rods each having a tie rod axis. Each of the two tie rods are attached in the rack so that the tie rod axis is offset from the rack axis. The rack and pinion assembly can be used as the steering system in a vehicle, to control vehicular motion.

The steering system described in the present invention, includes an rack and pinion assembly. An advantage of using the steering system is that it provides a new option for packaging the suspension components in the engine compartment with relation to the engine and the transmission components. The offset tie rod provides additional flexibility in positioning the rack and pinion. Compact packaging can be provided by the offset of the tie rod with respect to the rack in the steering system. The tie rod can be oriented for maximum geometric benefit in the engine compartment. Compact packaging in the engine compartment results in a reduction in the height of the vehicle from the ground. Further, the new option for packaging of vehicle components, provided in the present invention, also provides a choice of mounting small-diameter wheels on the vehicle.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention, as described in the claims.

What is claimed is:

1. A steering system for a vehicle, the steering system comprising:
    a rack having a rack axis and first and second fins, the rack movable in a linear direction;
    first and second bearings slidably supporting a respective fin configured for slidable movement with a respective bearing; and
    a housing enclosing at least a portion of the first and second fins, the housing having a first groove and a second groove for supporting the first bearing and the second bearing, respectively;
    two tie rods, each of the two tie rods having a tie rod axis offset from the rack axis, each of the two tie rods having a first end operably connected to the rack and a second end operably connected to a wheel of the vehicle; and
    wherein the first and second generally oppositely extend from the rack and are configured to balance torsional and bending loads associated with the offset tie rods.
2. The steering system of claim 1, wherein each groove is a U-shaped groove and each bearing is a U-shaped bearing.
3. The steering system of claim 2, wherein each bearing is a non-roller bearing.
4. The steering system of claim 1, wherein each bearing is a non-roller bearing.
5. The steering system of claim 1, wherein the tie rod axis offset is 25 mm.
6. The steering system of claim 1, wherein each tie rod is operably connected to a respective end of the rack above the rack axis.

* * * * *